Aug. 19, 1969    R. J. KIELAS ET AL    3,461,752
PRECISION BORING GROOVING AND RECESSING HEAD
Filed April 14, 1967    3 Sheets-Sheet 1
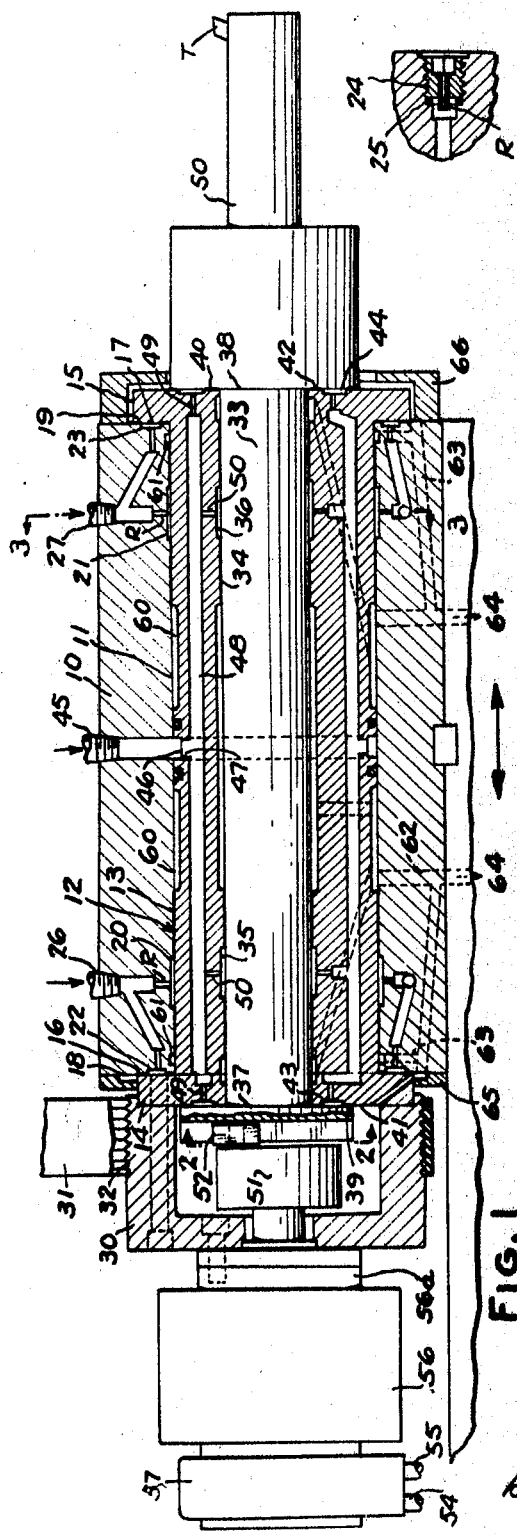
FIG. 1
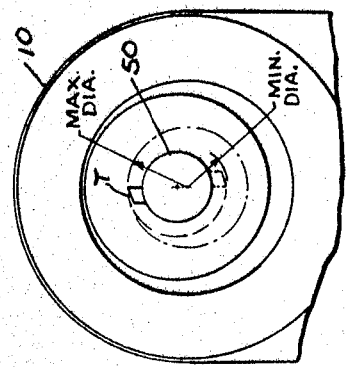
FIG. 5
FIG. 4
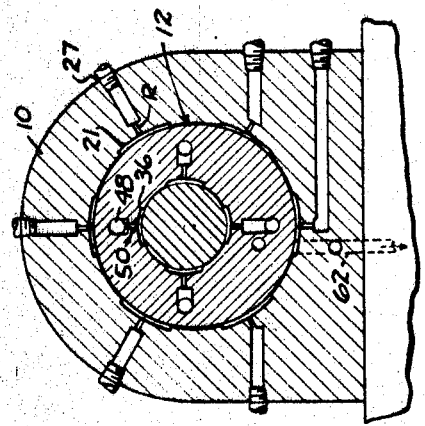
FIG. 3
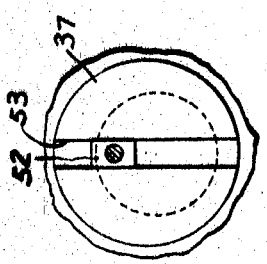
FIG. 2
INVENTORS
ROBERT J. KIELAS &
GORDON H. PORATH
BY
Barnes, Kisselle, Raisch & Choate
ATTORNEYS

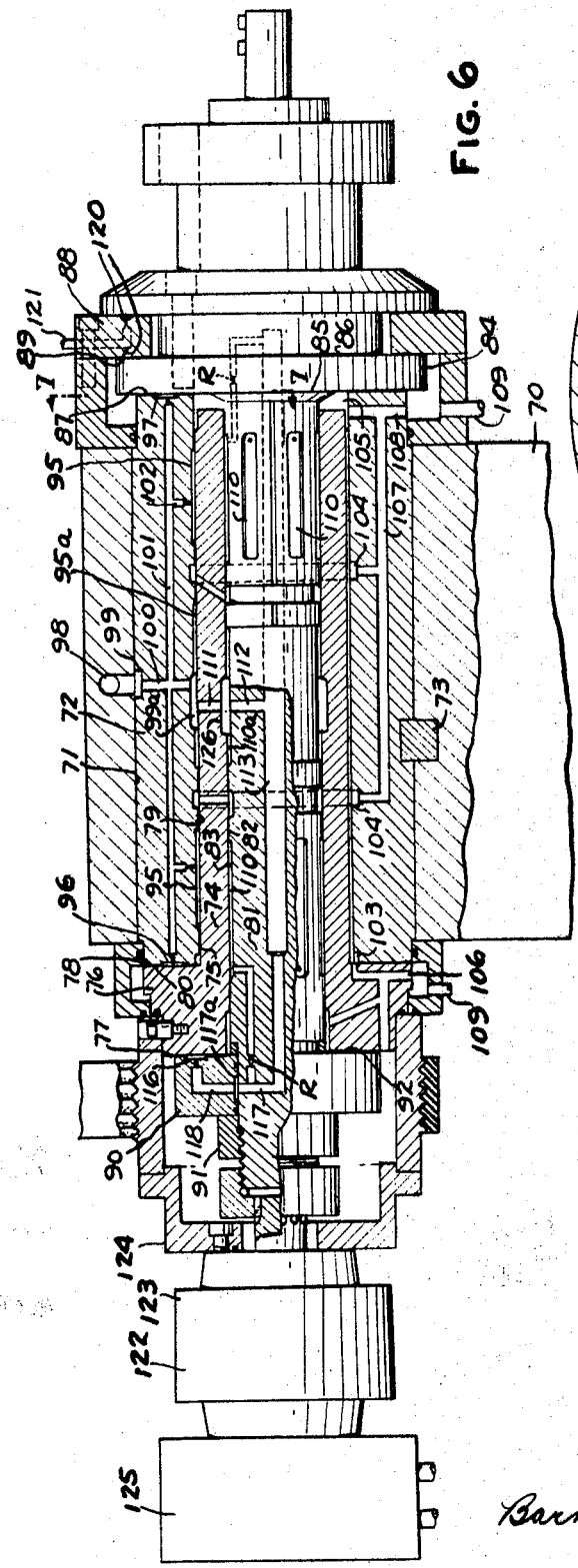

Aug. 19, 1969  R. J. KIELAS ET AL  3,461,752
PRECISION BORING GROOVING AND RECESSING HEAD
Filed April 14, 1967  3 Sheets-Sheet 3

INVENTORS
ROBERT J. KIELAS &
GORDON H. PORATH
BY
Barnes, Kisselle, Raisch & Choate
ATTORNEYS United States Patent Office 3,461,752
Patented Aug. 19, 1969

3,461,752
PRECISION BORING GROOVING AND RECESSING HEAD
Robert J. Kielas, Livonia, and Gordon H. Porath, Detroit, Mich., assignors to The Babcock & Wilcox Company, New York, N.Y., a corporation of New Jersey
Filed Apr. 14, 1967, Ser. No. 631,004
Int. Cl. B23b 29/02; F16c 7/04
U.S. Cl. 77—58                                      13 Claims

ABSTRACT OF THE DISCLOSURE

This application describes a machine tool comprising a base, a first member rotatably mounted with respect to the base and a second member mounted in the first member in eccentric relation thereto and supporting a tool or other work engaging member. Each of the base, first member and second member have complementary surfaces and are rotatably mounted relative to one another by hydrostatic bearings. The second member is angularly adjustable to vary the position of the tool or work engaging member radially with respect to the first-mentioned member. Either the base or the first member can be mounted for sliding movement axially.

Background of the invention

This invention relates to machine tools and particularly to a precision boring and grooving head for forming openings in workpieces or facing or grooving a workpiece.

Precision boring and rough boring as applied to grooves, chamfers, recesses and other locally enlarged sections of a bored hole is a distinctly specialized technique, which has certain well-defined problems. In the first place, the tool is rotating so that the extension motion applied to the tool must be generated either by a drawbar through a rotating coupling, which transmits axial force but not torque, or by a rotating actuator. Either way, some sort of sliding block or spiral cam or similar device must be used to produce extension of the tool bit radially. Such motions have a tendency to be complex, and to have many parts, and to have sticking and corrosion from chips, dust, coolant and the like which continually inundate the recessing head. In addition, the loose motion tends to permit tool vibration.

Another problem encountered is that, in order to operate satisfactorily, the parts producing the above motions must have quite a bit of clearance if both the drive force requirement and the variation in drive force are not to be too great to be tolerated. This leads to the usual dilemma; if the fits are very loose, dust and corrosion can get in and damage them, as noted above, and also the motions are subject to a series of jumps as the parts move from side to side as load varies. If the fits are tight the actuator force required is too great and the system wears rapidly. The compromise is always difficult and usually results in a susceptibility to vibration that is most undesirable.

Another problem, resulting from the tendency noted above to operate with reasonably loose fits is that the tool setting lacks accuracy, since the location at any given actuator position can vary by the amount of the freedom of movement of the mechanism. In addition, and as a part of the same problem, this looseness allows nonlinear tool deflection as a function of load, workpiece hardness. This latter condition results in out of roundness of the grooves.

Among the objects of the invention are to provide a boring and grooving head which can be used for rough and finish working of the workpiece; wherein the diameter of the operation performed on the workpiece can be varied at will and during the operation on the workpiece; and wherein a high degree of accuracy is achieved; wherein the movement of the working tool radially outwardly is achieved by a simple rotary motion rather than by the complex motions and linkages of the prior art which are vulnerable to external damage; wherein stick-slip motion and vibration of the tool under load are eliminated and wear between the moving parts is eliminated; which results in improved dimensional accuracy and tolerance of the grooves, recesses, chamfers and the like which are being formed.

Summary

Basically the machine tool embodying the invention comprises a base, a first member rotatably mounted with respect to the base and a second member mounted in said first member in eccentric relation thereto and supporting the tool, the latter being supported on the first member by hydrostatic bearings and being angularly adjustable to vary the position of the tool radially with respect to said first-mentioned member. The base can be mounted for sliding movement, the first member can be mounted for sliding movement, or the workpiece can be moved relative to the machine tool.

Description of the drawings

FIG. 1 is a longitudinal sectional view through an apparatus embodying the invention.
FIG. 2 is a fragmentary sectional view taken along the line 2—2 in FIG. 1.
FIG. 3 is a fragmentary sectional view taken along the line 3—3 in FIG. 1.
FIG. 4 is a partly diagrammatic end view taken from the right end as viewed in FIG. 1.
FIG. 5 is a fragmentary sectional view on an enlarged scale of a typical pressure pad utilized in the apparatus.
FIG. 6 is a longitudinal sectional view through another form of the invention.
FIG. 6a is a fragmentary sectional view of a variation of FIG. 6.
FIG. 7 is a fragmentary sectional view taken along the line 7—7 in FIG. 6.
FIG. 8 is a fragmentary sectional view taken axially through member 90 at a pocket.

Referring to FIG. 1, the apparatus comprises a base 10 that is adapted to be moved longitudinally toward and away from the workpiece. Alternatively the workpiece can be moved toward and away from the base. Base 10 includes a cylindrical opening 11 therein in which a first or intermediate member 12 is rotatably mounted. The first member 12 includes an outer cylindrical surface 13 complementary with the surface of the opening 11. First member 12 includes radially extending flanges 14, 15 at the ends thereof that have surfaces 16, 17 which are complementary to radial surfaces 18, 19 on the base 10.

Figure 9:
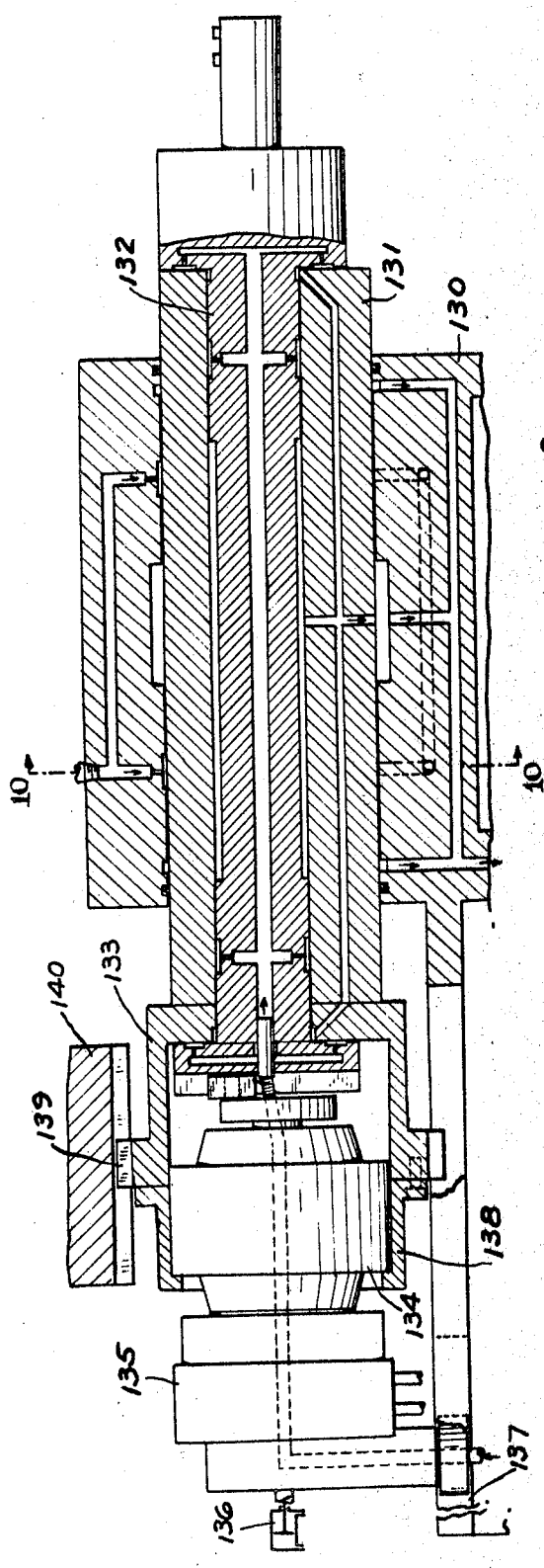
FIG. 9 is a longitudinal sectional view through a further form of the invention taken along the line 9—9 in FIG. 10.

Circumferentially spaced pressure pads or pockets 20, 21 are provided in the surface of the opening 11 and a restrictor R is associated with each pressure pad.

Similarly circumferentially spaced pressure pads or pockets 22, 23 are provided in the radial surfaces 18, 19 of the base 10.

A typical restrictor R is shown in FIG. 5 and comprises a screw 24 threaded into the base of the pressure pad and supporting, as by silver soldering, a capillary tube 25 to provide the restrictor or orifice.

In accordance with the invention, fluid under pressure is supplied under pressure through inlet passages 26, 27 and interconnecting passages to the pressure pads. As presently described, the fluid flows in a thin film between the surfaces to maintain the surfaces in stable position relative to one another. Any forces tending to move the member 12 relative to the base 10 are opposed by pressure forces which tend to return and thereby maintain the member 12 in stable relation with respect to the base 10.

As further shown in FIG. 1, a drive housing 30 is provided on one end of the member 12 and a grooved belt 31 engages annular ribs 32 in the periphery of the housing to rotate the housing and, in turn, the intermediate member 12 relative to the base 10. Other means of providing rotary motion may be used such as spur gears, timing belts or chains.

A second member or shaft 33 is mounted within the first member 12. Specifically first member 12 includes a cylindrical opening 34 which is generally complementary to the outer diameter of the shaft 33. Circumferentially spaced sets of pressure pads or pockets 35, 36 are provided in the sides of the opening 34 and a restrictor R is associated with each pressure pad. The ends of the shaft 33 are formed with enlarged radial portions or thrust faces 37, 38 that define radial surfaces 39, 40 which are complementary to surfaces 41, 42 on intermediate member 12. Circumferentially spaced pressure pads 43, 44 are provided on the surfaces 41, 43 respectively and a restrictor R is associated with each pressure pad. Fluid under pressure is supplied to the pads 35, 36, 43, 44 through an inlet passage 45 in the base 10 which extends to an annular groove 46 in the first member 12. The fluid then passes through circumferentially spaced radial passages 47 to longitudinally extending passages 48 and connecting passages 49, 50 to the restrictors and, in turn, the respective pressure pads. In this fashion a thin film of fluid flows continuously under pressure between the surfaces of the member 12 and member 33 to maintain the members in stable relation relative to one another.

As shown in FIGS. 3 and 4, the axis of the opening 34 is eccentric to the axis of the opening 11, that is, the axis of the opening 34 is spaced from and parallel to the axis of the opening 11. The second member or bar 33 is adapted to support a tool T by a tool support 50. It can be seen that by rotating the member 33 relative to the member 12, the diameter which is described by the tip of the tool T as the outer member 12 is rotated can be varied. As shown in FIG. 4, this can be varied between a maximum and a minimum diameter.

As shown in FIGS. 1 and 2, the relative angular position of the members 12, 33 can be changed and locked at any time by an arrangement which includes a rotary cylinder 56 which has its housing 56a fixed to the drive housing 30. A slide block 52 is fixed to the output shaft 51 of the rotary cylinder 56 so that rotation of the piston of the cylinder will rotate the slide block about the axis of the member 12 and, in turn, of the opening 11. The slide block 52 engages a diametrically extending groove 53 in the end 37 of the member 33. Thus if the slide block 52 is rotated, the block, engaging the groove 53, rotates the bar or member 33 relative to the member 12. In any position of the output shaft 51 of the cylinder 56, the angular or rotated position of the member 33 relative to member 12 will be fixed. Fluid under pressure is supplied to the rotary cylinder 56 through interconnecting lines 54, 55 and a fluid coupling 57. Any fluid may be supplied to the orifices but a liquid such as oil is preferred.

The size and number of pressure pads is selected such that the members are effectively supported out of contact. The relative dimensions between the complementary surfaces is such that a thin film of fluid flows between the surfaces and substantially all of the fluid is dissipated when it finally leaves the space between the surfaces. The space between the surfaces may range between two thousandths (0.002) of an inch and one ten-thousandth (0.0001) of an inch and preferably between one thousandth (0.001) of an inch and one ten-thousandth (0.0001) of an inch. Where machining limitations prevent obtaining uniform control of dimensions, satisfactory results will be achieved provided that at least some portions of the spaces between the surfaces are within the above limits.

Referring to FIG. 1, where liquid is used, appropriate drain passages should be provided. Thus centrally extending annular drain grooves 60, 61 are provided between the surfaces of the base 10 and member 12, drain passages 62, 63 extend from these grooves to a common passage 64. Similarly peripheral flanges 65, 66 are provided to collect the fluid from the radial surfaces so that it passes to the drain passages 63. Similar drain passages are provided for the pressure pads 35, 36, 43, 44.

In the form of the invention shown in FIGS. 6–8, the thrust faces are arranged as to employ a single plate, pressurized on both sides, for each rotating member thereby simplifying the assembly and mechanical construction. The system also utilizes a modified oil distribution system resulting in a less complicated outer member. Referring to FIG. 6, the apparatus comprises a base 70 that is adapted to be moved longitudinally toward and away from a workpiece or, alternatively, the workpiece can be moved toward and away from the base 70. Base 70 includes a cylindrical opening 71 in which a cylindrical insert 72 is mounted in fixed position and held therein by key 73. While this removable cartridge effect is not essential to the invention, it does form a convenient feature of particular value to a field installation. A first or intermediate member 74 is inserted with a cylindrical opening 75 in the insert 72 and includes an integral radially extending plate 76 having thrust surfaces 77, 78. Intermediate member 74 includes a cylindrical outer surface 79 that is complementary to the surface 75 and a radial surface 80 that is complementary to the surface 78. A second member 81 is rotatably mounted within first or intermediate member 74. Second member 81 has an outer cylindrical surface 82 complementary to a surface 83 of member 74. Second member 81 includes an integral radially extending plate 84 that has thrust face 85. Thrust face 85 is complementary to a radially extending face 87 of member 72. An annular flange plate 88 is bolted onto the housing 70 and has a radial face 89 complementary to the radial face 86 of the plate 84 of the second member 81. Similarly, a pressure plate 90 is fixed upon the inner member 81 at the other end by a threaded collar 91 and has a radial face 92 complementary to the thrust face 77 of the intermediate member 74.

Each of the complementary surfaces of the insert 73, and first and second members 74, 81 are provided with pressure pads or pockets and fluid is supplied thereto so that the first and second members are hydrostatically supported relative to one another and to the base, as presently described, except for the surfaces 86, 89 and 88, 120 which are for sealing only.

Specifically, surface 75 of insert 72 is provided with two axially spaced groups of pressure pads 95 extending circumferentially around the surface 79 and surface 80 is provided with a plurality of circumferentially spaced pressure pads 96 adjacent the surface 78. Similarly, surface 87 is provided with a plurality of circumferentially spaced pressure pads 97. Fluid is supplied to the pads 95, 96, 97 through an inlet 98 in the base 70 and which communicates with an annular groove 99 in the periphery of the insert 72. Radial passages 100 extend radially inwardly to feed fluid to intermediate member 74, through a seal 95a of the capillary leakage type, via an annular groove 99a. Axial passages 101 extend from passages 100 to pads 96, 97. Interconnecting passages 102 extend from the axial passages 101 to the endmost groups of pressure pads 95. The fluid flowing between the surfaces 75, 79 flows to annular drain grooves 103, 104, 105 and, in turn through drain passages 106, 107, 108 to exterior outlets 109.

Surface 82 of the inner or second member 81 is formed with a plurality of groups 110 of pressure pads or pockets spaced axially along the surface 82 adjacent surface 83. Fluid is supplied to the pads 110 by interconnecting radial passage 111, annular ring 126, and radial passage 112 to an axial supply passage 113. Cupillary leakage seal 110a controls leakage across this gap. Axial supply passage 113 also supplies fluid to pressure pads 116 through a radial passage 117 in the first member 81, annular groove 117a, and passage 118 in the plate 90. Finally, the annular plate 88 has annular passages 120 on both sides therein through which air for sealing is admitted through a separate inlet 121. A mechanical seal, such as is shown in FIG. 6a, could also be used, in which air is admitted through inlet 121 to recessed groove 120 in the large annular groove 127. A wiper 126 of Teflon or other suitable seal material is forced against the surface 128 of rotor 81 to form an oil seal.

Each of the pressure pads is provided with a restrictor R (FIG. 8) in accordance with the previous form of the invention.

As in the previous form of the invention, the relative angular position of the members 74, 81 can be changed and locked by an arrangement which includes a rotary cylinder 122 which has its outer housing 123 fixed to the drive housing 124 in eccentric relation to the opening in the base 70. A rotary fluid coupling 125 is mounted on the housing 123 in concentric relation with the opening in the base 70, to provide hydraulic fluid to rotary cylinder 122. Rotary drive of the intermediate member 74 is provided by a belt as before, engaging the outer surface of drive housing 124.

Figure 10:
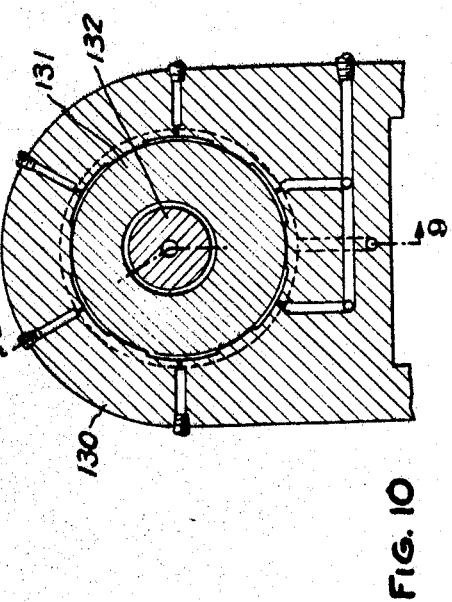
FIG. 10 is a fragmentary sectional view taken along the line 10—10 in FIG. 9.

In the form of the invention shown in FIGS. 9 and 10, the base 130 is fixed axially while the intermediate member 131 and center member 132 are movable axially. In order to achieve this, the drive housing 133, rotary cylinder housing 134 and fluid coupling 135 are mounted on the intermediate member 131 for axial movement therewith. A cylinder 136 of some commercial rotatable piston type may be used for axial motion to prevent rotation of the intermediate member 131, rotary cylinder 134 and fluid coupling 135. Drive is provided by gear 139, engaging spline 140, which is rotatable. In all other respects, the members 130, 131, 132 are rotatably mounted relative to one another by the use of hydrostatic pressure pads as in the previous form of the invention.

We claim:
1. The combination comprising
   a base having an opening therein,
   a first member in said opening,
   said base and said first member having complementary surfaces,
   said surfaces having at least two sets of circumferentially spaced pressure pads therein,
   means for rotating said first member relative to said base,
   said first member having an opening therein with an axis parallel to the axis of rotation of said first member relative to said base,
   a second member within said opening in said first member,
   said second member and said first member having complementary surfaces,
   at least two sets of circumferentially spaced pressure pads associated with at least one of said last-mentioned surfaces,
   said first member being thereby rotatably mounted with respect to said base and said second member being thereby rotatably mounted with respect to said first member about an axis spaced from and parallel to the axis of rotation of said first member relative to said base,
   means for holding said second member in predetermined angular position relative to said first member,
   means for supporting a tool on said second member,
   a restrictor associated with each said pressure pad,
   and means for supplying fluid under pressure to each said pad through its respective restrictor whereby a film of fluid under pressure flows continuously through said pressure pads and between said complementary surfaces to maintain said first member in predetermined spaced relation to said base and said second member in predetermined spaced relation to said first member,
   means for moving said first member and said second member axially of said base.

2. The combination set forth in claim 1 including means for changing the angular position of said second member with respect to said first member,
   and means for maintaining said angular positions during longitudinal movement of said second member relative to said base.

3. The combination comprising a base having a cylindrical opening therein,
   a first member in said opening, said base and said first member having complementary cylindrical and radial surfaces,
   each said surface having at least one set of circumferentially spaced pressure pads associated therewith,
   means for rotating said first member relative to said base,
   said first member having a cylindrical opening therein with an axis spaced from the axis of said opening in said base,
   a second member in said opening in said first member,
   said second member and said first member having complementary cylindrical and radial surfaces,
   at least one set of circumferentially spaced pressure pads associated with each complementary pair of said last-mentioned surfaces,
   said first member being thereby rotatably mounted with respect to said base and said second member being thereby rotatably mounted about an axis spaced from and parallel to the axis of rotation of said first member relative to said base,
   means for holding said second member in predetermined rotated position relative to said first member,
   means for supporting a tool on said second member,
   a restrictor associated with each said pressure pad,
   and means for supplying fluid under pressure to each said pad through its respective restrictor whereby a film of fluid under pressure flows continuously through said pressure pads and between said complementary surfaces to maintain said first member in predetermined spaced relation to said base and said second member in predetermined spaced relation to said first member,
   one of said first member, second member and base being movable axially relative to the other of said first member, second member and base, 4. The combination set forth in claim 3 wherein said one movable member has individual radial surfaces and an associated fourth member with complementary radial surfaces,
   one of said last-mentioned complementary radial surfaces having a plurality of circumferentially spaced pressure pads thereon,
   a restrictor associated with each said pressure pad,
   and means for supplying fluid under pressure to each said pressure pad through said restrictor.

5. The combination comprising a base having a cylindrical opening therein,
a first member in said opening, said base and said first member having complementary cylindrical and radial surfaces,
each said surface having at least one set of circumferentially spaced pressure pads associated therewith,
means for rotating said first member relative to said base,
said first member having a cylindrical opening therein with an axis spaced from the axis of said opening in said base,
a second member in said opening in said first member,
said second member and said first member having complementary cylindrical and radial surfaces,
at least one set of circumferentially spaced pressure pads associated with each complementary pair of said last-mentioned surfaces,
said first member being thereby rotatably mounted with respect to said base and said second member being thereby rotatably mounted about an axis spaced from and parallel to the axis of rotation of said first member relative to said base,
means for holding said second member in predetermined rotated position relative to said first member,
means for supporting a tool on said second member,
a restrictor associated with each said pressure pad,
and means for supplying fluid under pressure to each said pad through its respective restrictor whereby a film of fluid under pressure flows continuously through said pressure pads and between said complementary surfaces to maintain said first member in predetermined spaced relation to said base and said second member in predetermined spaced relation to said first member.

6. The combination set forth in claim 5 including means for moving said base longitudinally in a direction parallel to the axes of rotation of said members.

7. The combination set forth in claim 5 including means for varying the angular position of said tool relative to said first member.

8. The combination set forth in claim 7 wherein said last-mentioned means comprises a rotary cylinder.

9. The combination set forth in claim 5 wherein said last-mentioned means comprises a rotary cylinder,
and a member associated with the piston of said cylinder and engaging a diametrical groove in the end of said second member.

10. The combination set forth in claim 5 wherein said means for supplying fluid to said pressure pads comprises a plurality of inlet passages in said base extending to the pressure pads between said surfaces of said base and said first member,
an annular groove in the periphery of said first member,
an inlet passage extending through said base to said groove,
longitudinally extending passages in said first member, and interconnecting passages between said annular groove and said longitudinal passages and between said longitudinal passages and the respective pressure pads in said first member between the surfaces of said first member and said second member.

11. The combination set forth in claim 5 wherein said radial surfaces on said base comprise spaced axially outwardly facing longitudinally spaced surfaces,
said first member having longitudinally spaced radial flanges with axially inwardly facing surfaces forming the radial surfaces thereon which are complementary to said radial surfaces of said base,
said second member having spaced flanges with axially inwardly facing surfaces forming the radial surfaces thereon,
said flanges of said first member having radial surfaces on the opposite surfaces thereof which form the radial surfaces complementary to the surfaces of said second member.

12. The combination set forth in claim 5 wherein said radial surfaces on said base comprise axially outwardly facing longitudinally spaced surfaces,
said first member having a radial flange with a radial surface forming the radial surface on said first member which is complementary to one of said last-mentioned surfaces of said base,
said second member having a radial flange with a radial surface which forms the radial surface of said second member which is complementary to the other radial surface of said base,
said flange of said first member having a radial surface complementary to the other of said last-mentioned radial surface of said base,
said second member having a radially extending flange with a radial surface,
said flange of the first member having a second radial surface complementary to said last-mentioned radial surface of said second member.

13. The combination set forth in claim 5 wherein said first and second members are movable axially relative to said base,
said first member having spaced axially outwardly facing radial surfaces,
said second member having spaced radially extending flanges with said radial surfaces thereof complementary to said radial surfaces of said first member.

References Cited

UNITED STATES PATENTS

| | | |
|---|---|---|
| 1,906,715 | 5/1933 | Penick. |
| 2,671,700 | 3/1954 | Seyffert _____ 308—9 |
| 2,820,376 | 1/1958 | Jannenga et al. _____ 77—58.34 |
| 3,005,666 | 10/1961 | Morser et al. _____ 308—122 |
| 3,013,845 | 12/1961 | Loch _____ 308—9 |
| 3,223,463 | 12/1965 | Porath _____ 308—9 |
| 3,374,711 | 3/1968 | Saunders _____ 77—3 |

GERALD A. DOST, Primary Examiner

U.S. Cl. X.R.

308—9, 122